(12) United States Patent
Foerch et al.

(10) Patent No.: US 8,944,430 B2
(45) Date of Patent: Feb. 3, 2015

(54) GUARD FOR A MACHINE FOR PROCESSING SHEETS, E.G. PUNCH OR PRINTING MACHINE, IN PARTICULAR IN THE REGION OF THE DELIVERY

(71) Applicant: Heidelberger Druckmaschinen AG, Heidelberg (DE)

(72) Inventors: Peter Foerch, Neustadt (DE); Bjorn Wilke, Darmstadt (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/055,119

(22) Filed: Oct. 16, 2013

(65) Prior Publication Data

US 2014/0102249 A1    Apr. 17, 2014

(30) Foreign Application Priority Data

Oct. 16, 2012    (DE) .......................... 10 2012 020 237

(51) Int. Cl.

| | | |
|---|---|---|
| B65H 31/00 | (2006.01) | |
| B41F 13/64 | (2006.01) | |
| B26D 7/06 | (2006.01) | |
| B27B 13/00 | (2006.01) | |
| F16P 1/02 | (2006.01) | |
| F16P 3/02 | (2006.01) | |
| B65H 29/04 | (2006.01) | |
| B65H 33/04 | (2006.01) | |

(52) U.S. Cl.
CPC ... *F16P 1/02* (2013.01); *F16P 3/02* (2013.01); *B65H 29/041* (2013.01); *B65H 33/04* (2013.01); *B65H 2402/441* (2013.01); *B65H 2301/42256* (2013.01); *B65H 2301/5421* (2013.01); *B65H 2401/222* (2013.01); *B65H 2402/343* (2013.01); *B65H 2402/45* (2013.01); *B65H 2407/10* (2013.01); *B65H 2407/22* (2013.01); *B65H 2601/321* (2013.01); *B65H 2601/521* (2013.01); *B65H 2801/21* (2013.01)
USPC ................. 271/207; 101/240; 83/94; 83/147; 83/860

(58) Field of Classification Search
USPC ................. 271/207; 101/240; 83/94, 147, 860
See application file for complete search history.

(56) References Cited

U.S. PATENT DOCUMENTS

| | | | |
|---|---|---|---|
| 6,006,670 A | | 12/1999 | Bantlin et al. |
| 6,325,195 B1 * | | 12/2001 | Doherty ........................ 192/133 |
| 2003/0160383 A1 * | | 8/2003 | Hirai ............................ 271/207 |

FOREIGN PATENT DOCUMENTS

| | | |
|---|---|---|
| DE | 197 01 645 A1 | 7/1998 |
| DE | 101 05 518 A1 | 8/2002 |
| DE | 102 43 733 A1 | 4/2003 |
| DE | 10 2007 003 880 A1 | 7/2008 |
| DE | 10 2007 012 639 A1 | 9/2008 |
| WO | 9106431 A1 | 5/1991 |
| WO | 97/35145 A1 | 9/1997 |

* cited by examiner

*Primary Examiner* — David H Bollinger
(74) *Attorney, Agent, or Firm* — Laurence A. Greenberg; Werner H. Stemer; Ralph E. Locher

(57) ABSTRACT

On a machine for processing sheets it is provided, in particular in a region of a delivery, to completely close a rear opening on the end side by at least one upper and one lower cover. Lateral openings are also closable by movable guards, which at least partially are formed from a transparent material.

10 Claims, 9 Drawing Sheets

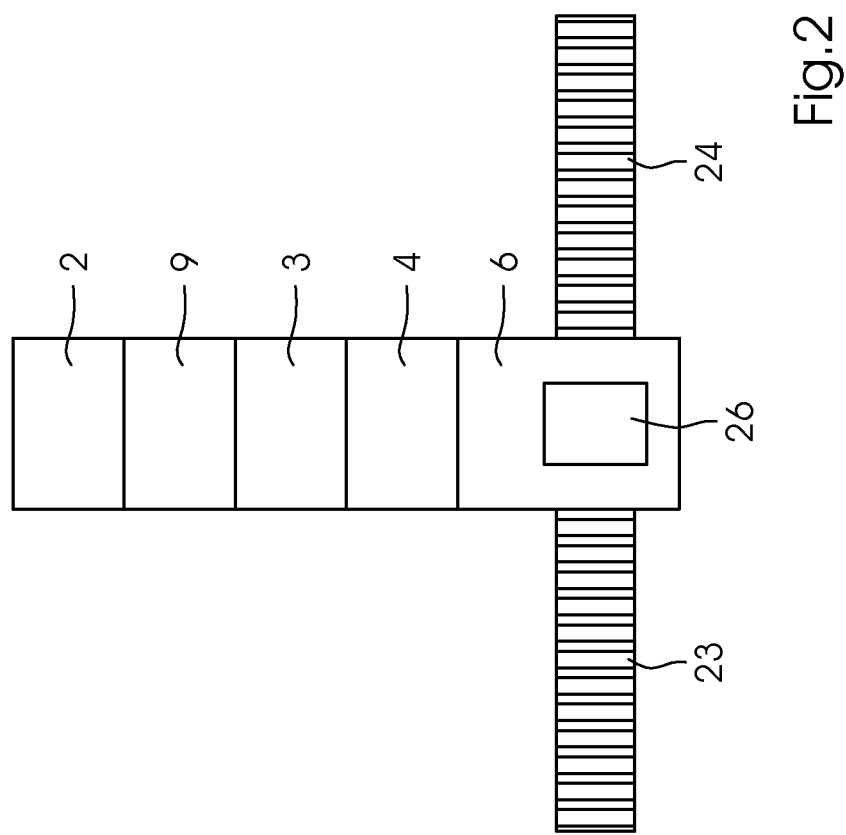

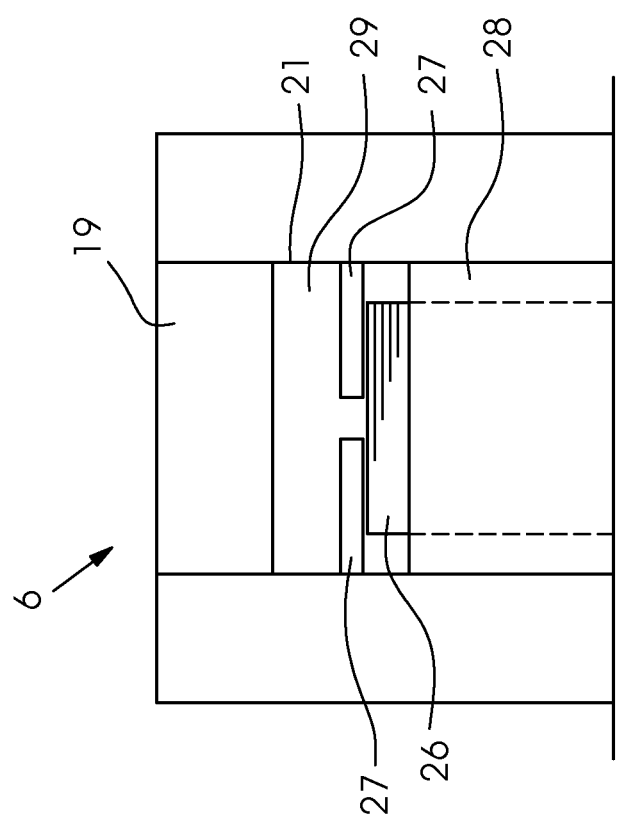

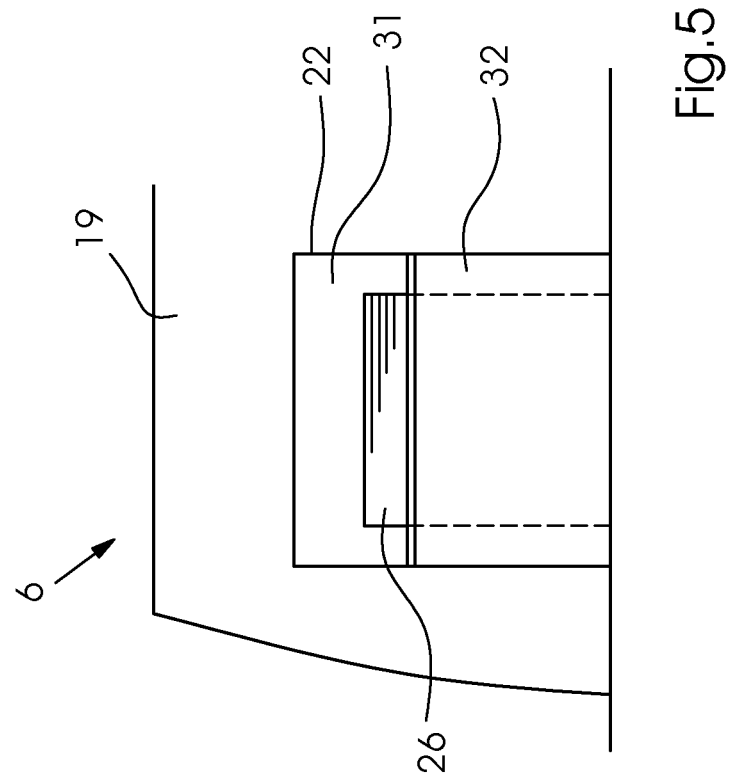

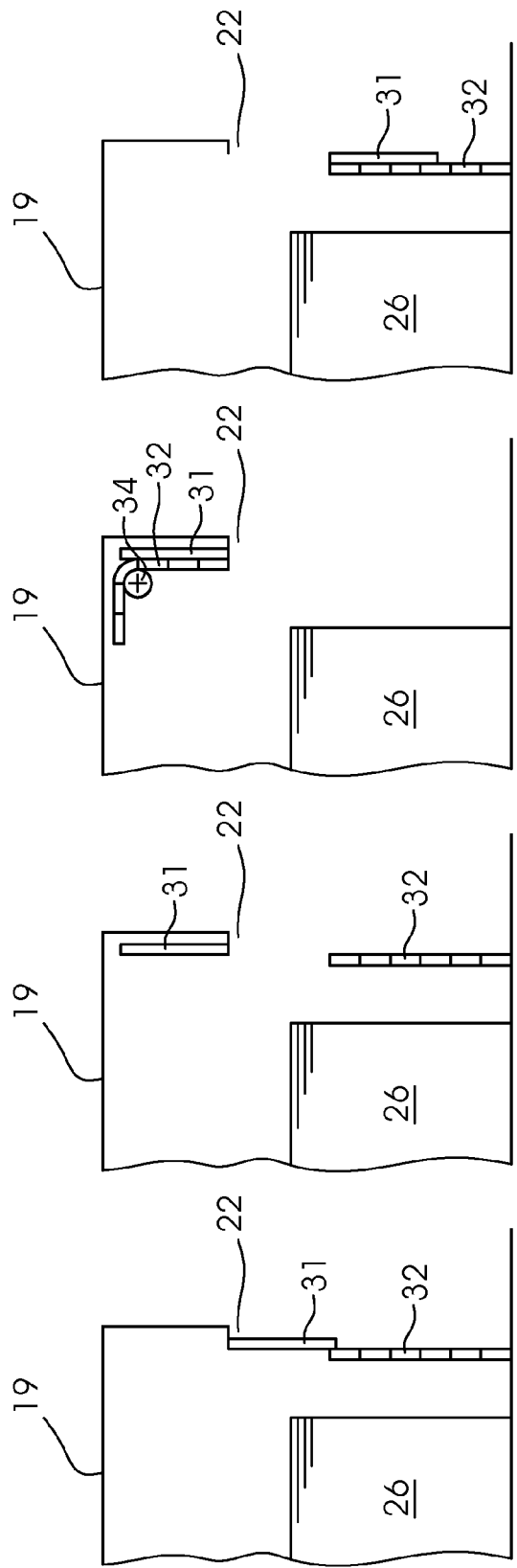

GUARD FOR A MACHINE FOR PROCESSING SHEETS, E.G. PUNCH OR PRINTING MACHINE, IN PARTICULAR IN THE REGION OF THE DELIVERY

CROSS-REFERENCE TO RELATED APPLICATION

This application claims the priority, under 35 U.S.C. §119, of German application DE 10 2012 020 237.7, filed Oct. 16, 2012; the prior application is herewith incorporated by reference in its entirety.

BACKGROUND OF THE INVENTION

Field of the Invention

A delivery having a rear opening on the end side for the delivery of a sheet stack is known from published, non-prosecuted German patent application DE 197 01 645 A1, corresponding to U.S. Pat. No. 6,006,670. The opening, which is located in the conveying direction of the sheets, is closable by a roller shutter.

Published, non-prosecuted German patent application DE 102 43 733 A1 shows a delivery of a sheet-fed rotary printing machine having an opening located on the end side in the conveying direction of the sheets, the opening being closable in a region below leading-edge stops by a double-leaf door.

The invention is based on the object of providing a screening or guard on a delivery of a machine processing sheets, the screening enabling good accessibility to the sheet stack.

SUMMARY OF THE INVENTION

It is accordingly an object of the invention to provide guard or screen for a machine for processing sheets, e.g. punch or printing machine, in particular in the region of the delivery, which overcome the above-mentioned disadvantages of the prior art devices of this general type.

With the foregoing and other objects in view there is provided, in accordance with the invention a device for screening a delivery of a machine for processing sheets, the delivery having an end side with a rear opening formed therein. The device contains guards including at least one upper guard and one lower guard for a complete closing of the rear opening on the end side.

It is a particular advantage of the invention that a rear opening on the end side of the delivery is completely closable. On account of this measure, the environment, and in particular the operators, are protected from contamination, e.g. by powders, and also from intrusive odors or noise which arise during operation, e.g. by opening or closing movements of grippers.

A particular advantage is achieved with a sheet stack which is laterally removable in relation to the conveying direction of the sheets, in that an opening on an end side provided in the conveying direction of the sheets is closed by a fixed lower cover and a movable upper cover. The lower cover is advantageously at least partially made from a transparent material, e.g. plastic or glass. The upper cover is displaceable, preferably also telescopically displaceable within itself, in order to enable operator access for servicing purposes or for the removal of sample sheets.

In the event that the delivery is completely covered, it is provided that the lateral delivery openings are provided with a fully closable cover, e.g. a roller shutter, which covers the opening during industrial operation and can be opened for the removal of the sheet stack.

Other features which are considered as characteristic for the invention are set forth in the appended claims.

Although the invention is illustrated and described herein as embodied in a guard or screening for a machine for processing sheets, e.g. punch or printing machine, in particular in the region of the delivery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a plan view of the machine for processing sheets;

FIG. 3 is a rear view of an end side of a delivery;

FIG. 5 is a lateral view of the delivery;

FIGS. 6A-6D are illustrations showing a section of a lateral cladding in various positions;

DETAILED DESCRIPTION OF THE INVENTION

Figure 1:
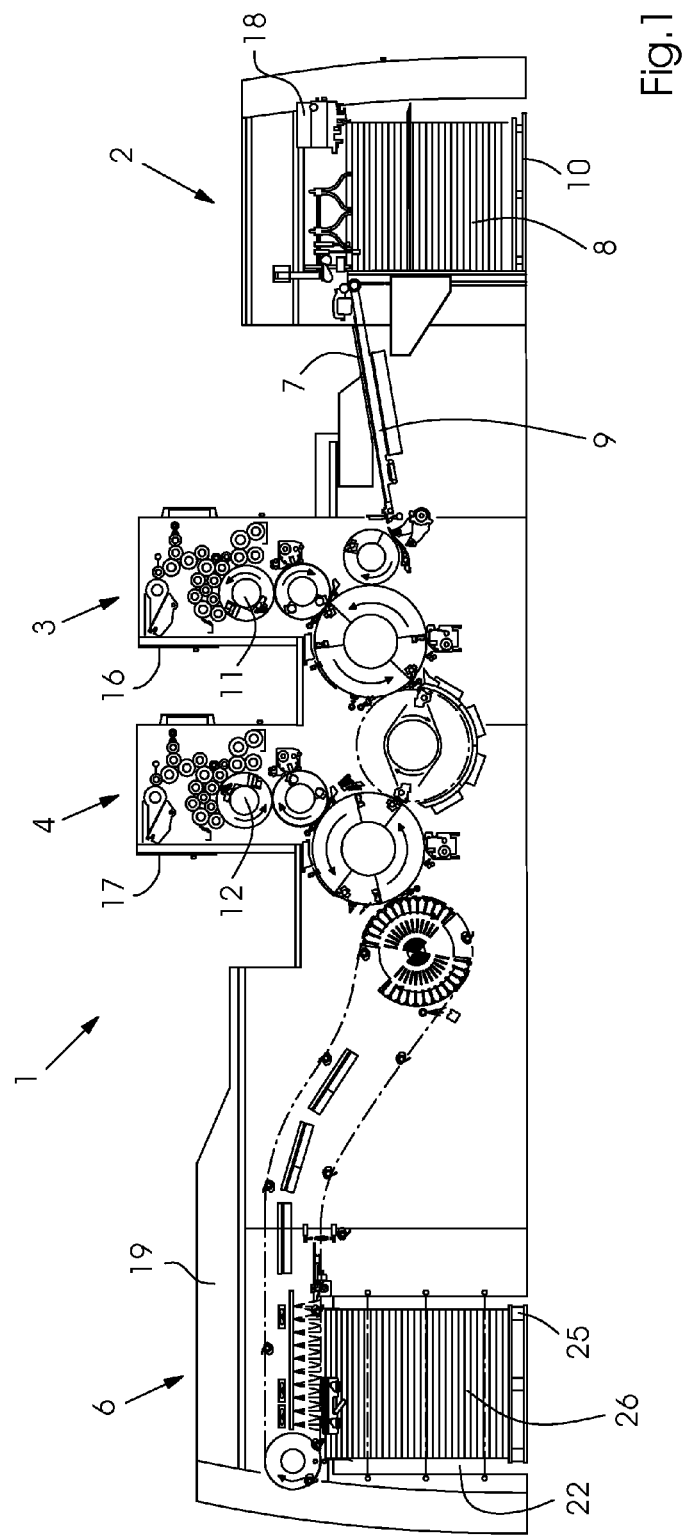
FIG. 1 is a diagrammatic, side sectional view of a sheet-fed rotary printing machine according to the invention.

Referring now to the figures of the drawing in detail and first, particularly, to FIG. 1 thereof, there is shown a machine for processing sheets 7, e.g. a punch or printing machine 1, has a feeder 2 and a delivery 6. In the case of a printing machine 1, sheets 7 are removed from a sheet stack 8 and fed individually or in an overlapping formation via a feeding table 9 to printing units 3 and 4. In a known manner, the latter have in each case one plate cylinder 11, 12. The plate cylinders 11 and 12 in each case have a device for fastening flexible printing plates. Beyond this, each plate cylinder 11, 12 is assigned a device 16, 17 for the semi-automatic or fully automatic changeover of printing plates.

The sheet stack lies on a stack plate 10 which is elevatable in a controlled manner. The removal of the sheets 7 take places from the upper side of the sheet stack 8 by what is referred to as a suction head 18, which inter alia has a number of lifting and dragging suction cups for the separation of the sheets 7. Beyond this, blower units for loosening the upper sheet layers and sensing elements for advancing the stack are provided. For the alignment of the sheet stack 8, in particular the upper sheets 7 of the sheet stack 8, a number of lateral and rear stops are provided.

The delivery 6 has a housing 19, which substantially consists of a frame having one rear opening 21 on the end side and additional lateral openings 22. The delivery 6 laterally has, as illustrated in FIG. 2, at least one conveying path 23; 24 for a lateral feeding of pallets 25 or a lateral discharge of a sheet stack 26. The delivery 6 has what is referred to as an operating bar 27, which is located transversely to the conveying direction of the sheets, approximately level with the sheet stack 26 (see FIG. 3).

A cover, e.g. a fixed guard 28 or a roller shutter (upper displaceable guard) 29, covers a lower part of the rear opening 21 on the end side. The guard 28 is preferably made from a sound-dampened metallic material or from a transparent material, such as e.g. glass or plastic. An upper part of the rear opening 21 on the end side is covered by the displaceable guard 29. The displaceable guard 29 is made from a transparent material, such as e.g. glass or plastic, such that a view of the sheet stack 26 is possible also in the closed state.

Figure 4C:
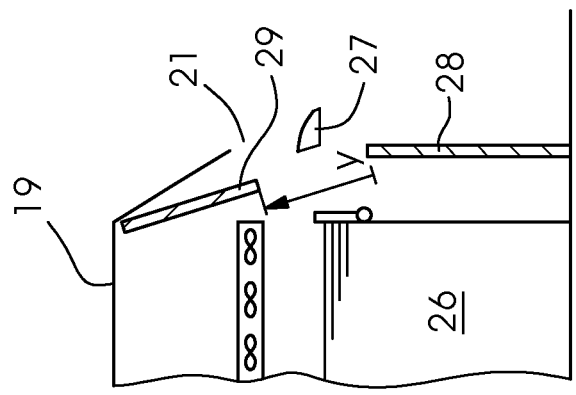
FIGS. 4A-4E are lateral views of a section of the delivery.
Figure 4B:
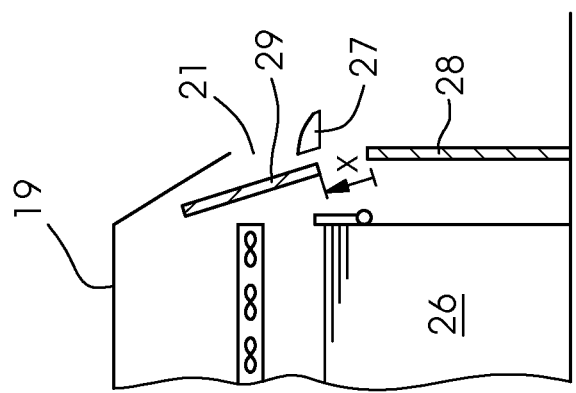
Figure 4A:
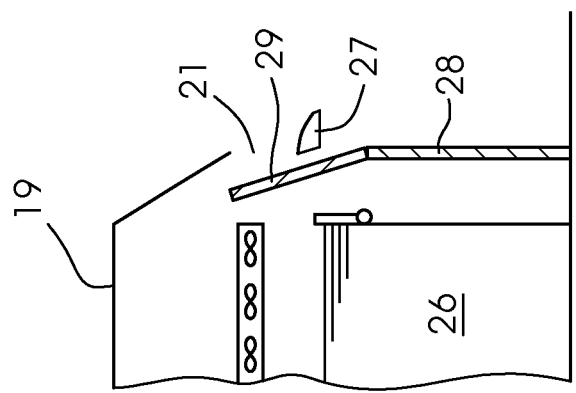

FIG. 4A shows the closed upper guard 29 which is in contact with the lower guard 28.

FIG. 4B shows the guard 29 upwardly displaced by a gap x. On account of the gap opening being created, operators are offered the possibility to work on the sheet stack 26 during operation, e.g. by placing wedges, or to undertake a removal of sample sheets.

FIG. 4C shows the guard 29 in a completely opened position, e.g. in order to be able to undertake service work on the delivery 6, in particular on gripper bridges, blowers, etc.

Figure 4E:
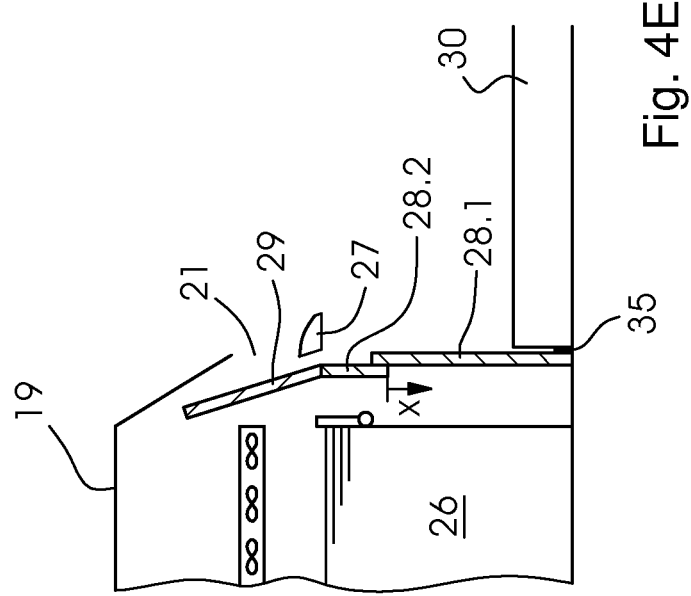
Figure 4D:
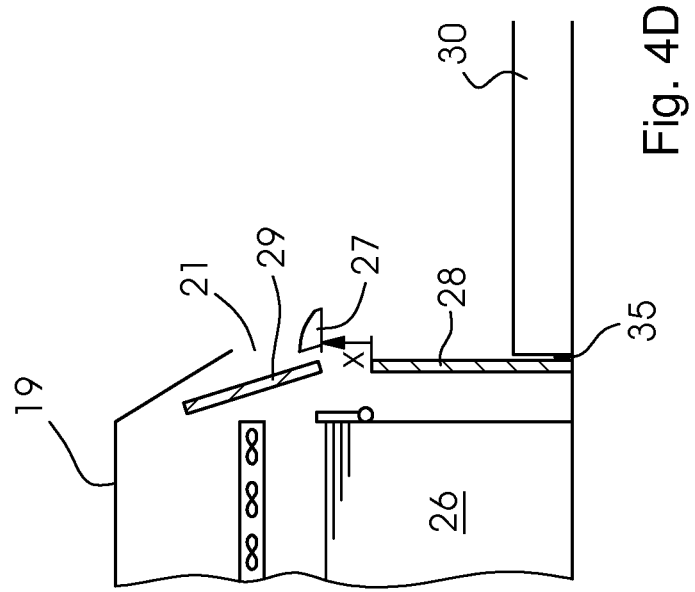

FIG. 4D shows the delivery 6 having a delivery platform 30. In the case of such a configuration it is provided that the lower guard 28 is located such that it is displaceable into a recess 35 in the delivery platform 30. On account of this measure, a gap x between the upper guard 29 and the lower guard 28 can be created.

FIG. 4E shows a lower guard 28.1, 28.2 in two parts, wherein the one part-guard 28.1 is located in a stationary manner in the recess 35 of the delivery platform 30, and the second part-guard 28.2 is located such that it is displaceable by a path x in order to, jointly with the upper guard 29, completely close the opening 21 on the end side.

Lateral covers in the form of guards 31, 32 close the lateral openings 22.

FIG. 6A shows the upper lateral guard 31, e.g. consisting of a transparent material such as glass or plastic, which, for opening, is mounted so that it is upwardly displaceable. The lower guard 32 is e.g. configured as a roller shutter and can likewise be upwardly displaced on guides which are located on the delivery frame 19.

FIG. 6B shows the lateral opening 22 having the guard 31 which has been upwardly displaced. In this position it is possible for the service personnel to undertake work, such as e.g. the placing of wedges, on the stack 26 during operation.

FIG. 6C shows a complete opening of the lateral opening 22, in which both the upper guard 31 and also the lower guard 32 have been upwardly displaced so far that the lateral opening 22 is completely exposed. In this position of the guards, the sheet stack 26 can be laterally removed from the delivery 6. At the same time, the delivery 6 is laterally accessible for undertaking service work.

In the case of an alternative embodiment according to FIG. 6D it is provided that the upper guard 31 is downwardly displaceable during operation for the creation of an access to the stack.

Figure 7C:
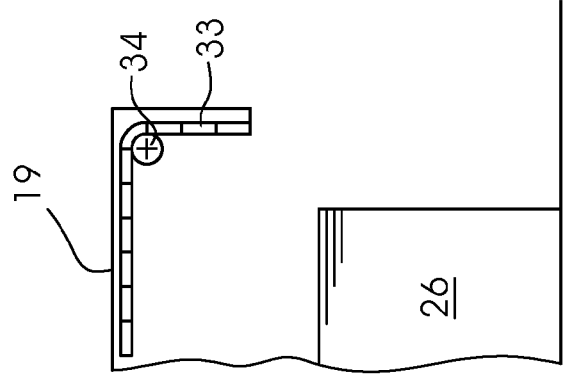
FIGS. 7A-7C are illustrations showing an alternative lateral cladding.
Figure 7B:
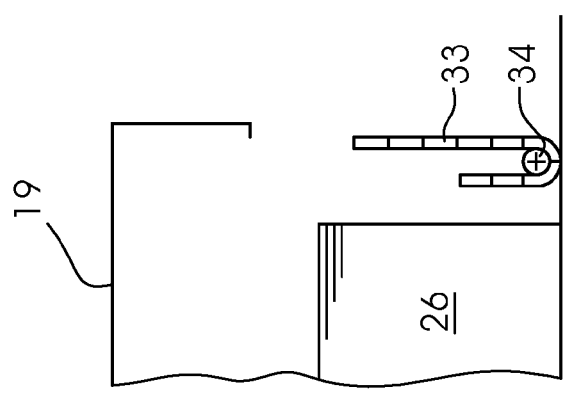
Figure 7A:
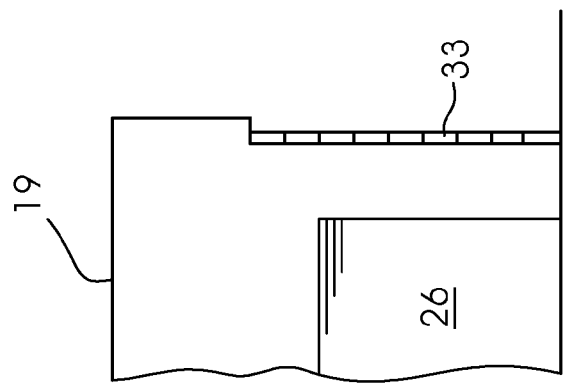

In a further embodiment it is provided according to FIGS. 7A to 7C that just one roller shutter 33 is provided in order to close the lateral opening 22. The roller shutter 33 has deflections 34 which make it possible for the roller shutter 33 to be downwardly displaced during operation for the creation of an access to the stack 26. For removing the stack, the roller shutter 33 is completely displaced in an upward manner.

Figure 8B:
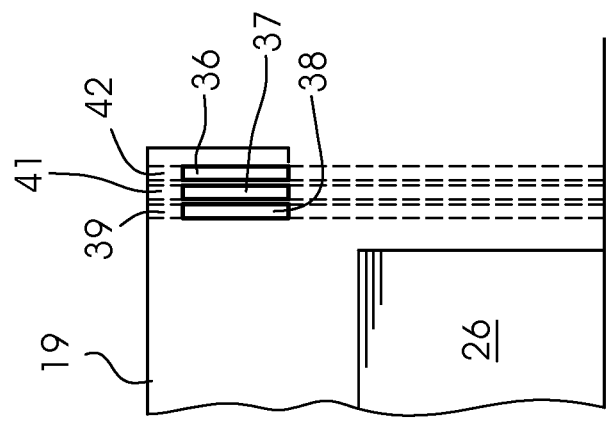
FIGS. 8A and 8B are illustrations showing lateral claddings having guides.
Figure 8A:
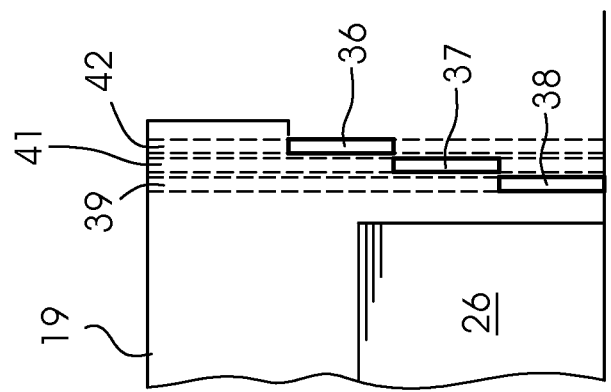

In an exemplary embodiment according to FIGS. 8A, 8B it is provided that a cover for the lateral openings 22 and/or rear openings 29 on the end side is implemented by vertically displaceable guards 36, 37, 38. The guards 36, 37, 38 are located in guides 39, 41, 42 which are arranged in a parallel manner. The guards 36, 37, 38 can be secured in arbitrary positions. In an opened position according to FIG. 8B, the guards 36 to 38 are located in parallel in an upper region of the delivery 6.

The invention claimed is:

1. A delivery guard for covering a rear opening formed in an end side of a delivery of a machine for processing sheets, the delivery guard comprising:
    guards including at least one upper guard and one lower guard for a complete closing of the rear opening on the end side;
    said at least one upper guard being pivotably or displaceably disposed and said lower guard being in a fixed position.

2. The delivery guard according to claim 1, wherein said lower guard is configured in two parts and has a stationary part and a movable part.

3. The delivery guard according to claim 2, wherein said lower guard has sound-reducing dampening elements.

4. The delivery guard according to claim 1, wherein said at least one upper guard is one of a plurality of upper guards made from a transparent material.

5. The delivery guard according to claim 1, wherein said lower guard is one of a plurality of lower guards.

6. The delivery guard according to claim 1, wherein said guards are provided for covering lateral openings.

7. The delivery guard according to claim 6, further comprises roller shutters, one of said roller shutters closing each of the lateral openings partly or completely or exposing the lateral opening.

8. The delivery guard according claim 6, further comprising guides, said guards being provided for each of the lateral openings and said guards being displaceably mounted in said guides.

9. A punch for processing sheets, the punch comprising:
    a delivery guard according to claim 1.

10. A sheet-fed rotary printing machine for processing sheets, the printing machine comprising:
    a delivery guard according to claim 1.

* * * * *